(12) United States Patent  (10) Patent No.: US 8,702,972 B2
Lacijan et al.  (45) Date of Patent: Apr. 22, 2014

(54) SEPARATION PROCESS

(75) Inventors: Lawrence A. Lacijan, Palatine, IL (US); Hadjira Iddir, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 1269 days.

(21) Appl. No.: 12/549,817

(22) Filed: Aug. 28, 2009

(65) Prior Publication Data

US 2009/0318744 A1 Dec. 24, 2009

Related U.S. Application Data

(62) Division of application No. 11/346,032, filed on Feb. 2, 2006, now Pat. No. 7,601,305.

(51) Int. Cl.
*C10G 35/10* (2006.01)

(52) U.S. Cl.
USPC ........... 208/161; 208/151; 208/168; 422/140; 422/144; 422/147

(58) Field of Classification Search
USPC .......... 208/161, 168, 150, 151; 422/140, 144, 422/147
See application file for complete search history.

(56) References Cited

U.S. PATENT DOCUMENTS

| 4,670,410 A * | 6/1987 | Baillie ........................... 502/41 |
| 6,248,298 B1 * | 6/2001 | Senior et al. .................. 422/144 |
| 6,841,133 B2 * | 1/2005 | Niewiedzial et al. ......... 422/147 |
| 7,104,529 B2 * | 9/2006 | Laird et al. .................... 261/79.2 |
| 7,118,715 B1 * | 10/2006 | Hedrick et al. ................ 422/144 |
| 7,601,305 B1 * | 10/2009 | Lacijan et al. ................ 422/145 |

* cited by examiner

*Primary Examiner* — Nina Bhat

(74) *Attorney, Agent, or Firm* — James C Paschall

(57) ABSTRACT

A process is disclosed for the separation of solids from gases in a mixture which is most particularly applicable to an FCC apparatus. The mixture of solids and gases are passed through a conduit and exit through a swirl arm that imparts a swirl motion having a first annular direction to centripetally separate the heavier solids from the lighter gases. The mixture then enters a gas recovery conduit in which at least one plate radially extending from an inner wall impedes rotational motion of the mixture. The mixture enters cyclones at the other end of the gas recovery conduit without substantial swirling motion.

11 Claims, 3 Drawing Sheets

SEPARATION PROCESS

CROSS-REFERENCE TO RELATED APPLICATION

This application is a Division of copending application Ser. No. 11/346,032 filed Feb. 2, 2006, the contents of which are hereby incorporated by reference in its entirety.

BACKGROUND OF THE INVENTION

This invention relates generally to a process for the separation of solid particles from gases. More specifically, this invention relates to the separation of particulate catalyst materials from gaseous materials in an FCC process.

DESCRIPTION OF THE PRIOR ART

Cyclonic methods for the separation of solids from gases are well known and commonly used. A particularly well known application of such methods is in the hydrocarbon processing industry where particulate catalysts contact gaseous reactants to effect chemical conversion of the gas stream components or physical changes in the particles undergoing contact with the gas stream.

The FCC process presents a familiar example of a process that uses gas streams to contact a finely divided stream of catalyst particles and effects contact between the gas and the particles. The FCC processes, as well as separation devices used therein are fully described in U.S. Pat. Nos. 4,701,307 and 4,792,437.

Efficient separation of particulate catalyst from product vapors is very important in an FCC process. Particulate catalyst that is not effectively separated from product vapors in the FCC unit must be separated downstream either by filtration methods or additional separation devices that multiplicate separation devices utilized in the FCC unit. Additionally, catalyst that is not recovered from the FCC process represent a two-fold loss. The catalyst must be replaced, representing a material cost, and catalyst lost may cause erosion to downstream equipment. Severe erosion may cause equipment failure and subsequent lost production time. Accordingly, methods of efficiently separating particulate catalyst materials from gaseous fluids in an FCC process are of great utility.

In the FCC process, gaseous fluids are separated from particulate catalyst solids as they are discharged from a reaction conduit. The most common method of separating particulate solids from a gas stream uses centripetal separation. Centripetal separators are well known and operate by imparting a tangential velocity to gases containing entrained solid particles that forces the heavier solids particles outwardly away from the lighter gases for upward withdrawal of gases and downward collection of solids.

U.S. Pat. Nos. 4,397,738 and 4,482,451 disclose an arrangement for initial quick centripetal separation that tangentially discharges a mixture of gases and solid particles from a central reaction conduit or riser into a containment vessel. The containment vessel has a relatively large diameter and generally provides a first separation of solids from gases. In these arrangements, the initial stage of separation is typically followed by a second more compete separation of solids from gases in cyclones.

Another method of obtaining this initial quick separation on discharge from the reaction conduit is disclosed in U.S. Pat. No. 5,584,985. This patent discloses the contacting of feed and catalyst particles in a riser conduit. The exit from the riser conduit comprises an arcuate, tubular swirl arm which imparts a swirling, helical motion to the gases and particulate catalyst as they are discharged from the riser conduit into a separation vessel. The swirling, helical motion of the materials in the separation vessel effect an initial separation of the particulate catalyst from the gases. A gas recovery conduit communicates the separation vessel with cyclones in a reactor vessel. The mixture of gases and entrained catalyst is drawn up the gas recovery conduit and fed into cyclones to effect further separation of the particulate catalyst from the gases. This arrangement is known as UOP's VSS$^{SM}$.

Cyclones for separating particulate material from gaseous materials are well known to those skilled in the art of FCC processing. Cyclones usually comprise an inlet that is tangential to the outside of a cylindrical vessel that forms an outer wall of the cyclone. In the operation of an FCC cyclone, the entry and the inner surface of the outer wall cooperate to create a spiral flow path of the gaseous materials and catalyst that establishes a vortex in the cyclone. The centripetal acceleration associated with an exterior of the vortex causes catalyst particles to migrate towards the outside of the barrel while the gaseous materials enter an interior of the vortex for eventual discharge through an upper outlet. The heavier catalyst particles accumulate on the side wall of the cyclone barrel and eventually drop to the bottom of the cyclone and out via an outlet and a dipleg conduit for recycle through the FCC apparatus. Cyclone arrangements and modifications thereto are generally disclosed in U.S. Pat. Nos. 4,670,410 and 2,535,140.

We have found that the swirling of the mixture of gases and entrained catalyst exiting the swirl arms of the riser continues into the gas recovery conduit to a significant degree. The swirling of the mixture continues into the duct that communicates the gas recovery conduit with the cyclones. U.S. Pat. No. 6,841,133 recognized that by orienting the angular direction of the swirl motion of the mixture leaving the swirl arms of the riser to be counter to the angular direction of the swirl motion in the cyclones, the mixture entering the cyclone is more likely to first encounter the outer wall which generates the swirling motion in the cyclone. Hence, greater separation efficiency was achieved.

Accordingly, it is an object of the present invention to improve the efficiency of separating particulate solids from vapors in an FCC unit and the durability of the equipment used for such separation.

BRIEF SUMMARY OF THE INVENTION

We have found that the swirling of the mixture of gases and entrained catalyst exiting the swirl arms of the riser continues into the gas recovery conduit to a significant degree. The swirling of the mixture continues into the duct that communicates the gas recovery conduit with the cyclones. Consequently, the mixture swirls into the upstream wall of the duct at high velocity, presenting a potential erosion problem. The present invention is the provision of one or more plates in the gas recovery conduit that block and impede swirling motion in the gas recovery conduit. Accordingly, the mixture of gas and catalyst enter into the ducts of cyclones without or with minimal swirling. The walls of the ducts are not significantly impacted thereby mitigating erosion. Additionally, separation efficiency is maintained irrespective of the relational orientation of the riser swirl arms and the cyclones.

Additional details and embodiments of the invention will become apparent from the following detailed description of the invention.

DESCRIPTION OF THE PREFERRED EMBODIMENT

Figure 1:
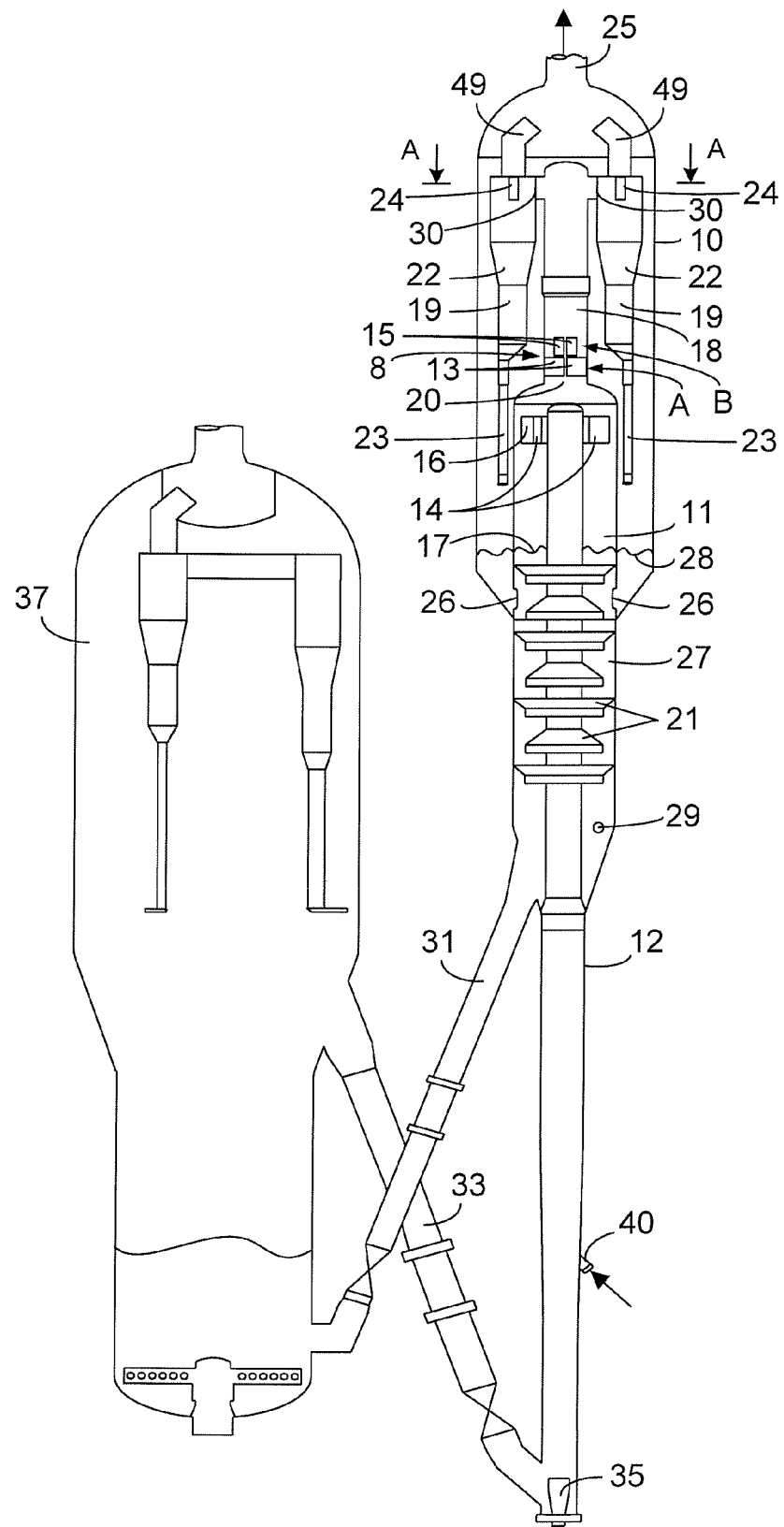
FIG. 1 is a schematic cross-sectional view of an FCC unit.

FIG. 1 is the schematic illustration of an FCC unit that will serve as a basis for illustrating several embodiments. The FCC unit includes a separation arrangement in a reactor vessel 10. A conduit in the form of a reactor riser 12 extends upwardly through a lower portion of the reactor vessel 10 in a typical FCC arrangement. The central conduit or reactor riser 12 preferably has a vertical orientation within the reactor vessel 10 and may extend upwardly through the bottom of the reactor vessel or downwardly from the top of the reactor vessel. Reactor riser 12 terminates in a separation vessel 11 at swirl exits in the form of swirl arms 14. Each swirl arm 14 is a curved tube that has an axis of curvature that is parallel to the reactor riser 12. The swirl arm 14 also has one end connected to the reactor riser 12 and another open end comprising a discharge opening 16. Swirl arms 14 discharge a mixture of gaseous fluids comprising cracked vaporous product and solid catalyst particles through the discharge opening 16. Tangential discharge of gases and catalyst from the discharge opening 16 produces a swirling helical motion about the interior of separation vessel 11. Centripetal acceleration associated with the helical motion forces the heavier catalyst particles to the outer portions of separation vessel 11. Catalyst particles from discharge openings 16 collect in the bottom of separation vessel 11 to form a dense catalyst bed 17. The gases, having a lower density than the solid catalyst particles, more easily change direction and begin an upward spiral with the gases ultimately traveling into a gas recovery conduit 18 through an inlet 20. The gases that enter a lower end of a gas recovery conduit 18 through inlet 20 will usually contain a light loading of catalyst particles. Inlet 20 recovers gases from the discharge openings 16 as well as stripping gases from a stripping section 27 which is hereinafter described. The loading of catalyst particles in the gases entering gas recovery conduit 18 are usually less than 16 kg/m$^3$ (1 lb/ft$^3$) and typically less than 2 kg/m$^3$ (0.1 lb/ft$^3$). The swirl motion imparted by the swirl arm 14 continues in the same angular direction up through the gas recovery conduit 18. A swirl impeding device 8 comprising at least one vane or plate 13 is attached such as by welding to an inner wall of the gas recovery conduit 18 to impede swirling of the mixture of vapor product and entrained catalyst. The plate 13 may extends radially from the inner wall of the gas recovery conduit and stops short of center of the conduit 18. Alternatively, the plate may chordally or diametrically extend all the way across the gas recovery conduit 18. Preferably, a group of plates 13 attached to the inner wall of the gas recovery conduit 18 all extend radially to converge at a center of the gas recovery conduit. The plates may radially extend to just short of center or may extend diametrically all the way across the gas recovery conduit 18. A group of chordally arranged plates 13 is also contemplated. To prevent swirling from reforming, a first stage of plates 13 may be used in conjunction with a second stage B of plates 15 such that the stages A and B and the plates 13 and 15, respectively, therein are vertically spaced in the gas recovery conduit 18. Preferably, two stages A and B of four radial plates 13 and 15 oriented at 90° with respect to adjacent plates in the stage comprise the swirl impeding device 8.

Gas recovery conduit 18 passes the separated gases from an upper end into cyclones 22 that effect a further removal of catalyst particulate material from the gases in the gas recovery conduit 18. The swirl impeding device 8 is suitably installed at the lower end of the gas recovery conduit 18, e.g., in the lower half and preferably in the lower quarter, so the straight flow pattern will have distance to develop before reaching the cyclones 22. Cyclones 22 create a swirl motion inside the cyclones to establish a vortex that separates solids from gases. A product gas stream, relatively free of catalyst particles, exits the cyclones 22 through vapor outlets 24 and outlet pipes 49. The product stream then exits the reactor vessel 10 through outlet 25 for further processing. Catalyst solids recovered by cyclones 22 exit the bottom of the cyclone through hoppers 19 and diplegs 23 and pass to a lower portion of the reactor vessel 10 where it forms a dense catalyst bed 28 outside the separation vessel 11. Catalyst solids in dense catalyst bed 28 enter a stripping section 27 through windows 26. Catalyst solids pass downwardly through the stripping section 27. A stripping fluid, typically steam, enters a lower portion of stripping section 27 through at least one distributor 29. Counter-current contact of the catalyst with the stripping fluid through a series of stripping baffles 21 displaces product gases from the catalyst as it continues downwardly through the separation vessel 11. Stripped catalyst from stripping section 27 passes through a conduit 31 to a catalyst regenerator 37 that regenerates the catalyst by high temperature contact with an oxygen-containing gas by oxidizing coke deposits from the surface of the catalyst. Following regeneration, catalyst particles enter the bottom of reactor riser 12 through a conduit 33 where a fluidizing gas from a distributor 35 pneumatically conveys the catalyst particles upwardly through the riser 12. As the mixture of catalyst and conveying gas continues up the riser 12, nozzle 40 injects feed into the catalyst, the contact of which vaporizes the feed to provide additional gases that exit through discharge openings 16 in the manner previously described.

Figure 2:
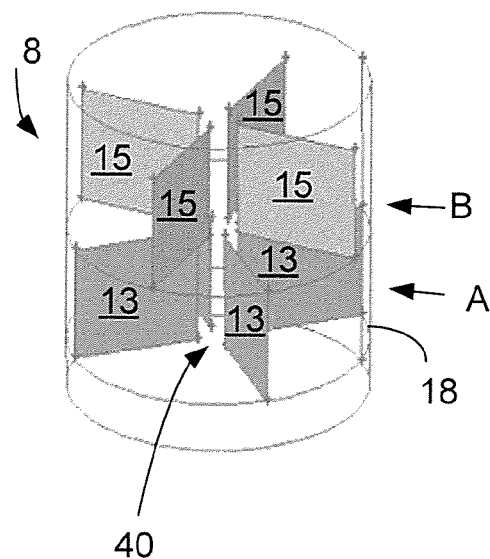
FIG. 2 is a perspective view of the swirl impeding device of the present invention.

FIG. 2 illustrates a segment of the gas recovery conduit 18 containing a preferred configuration of the swirl impeding device 8 in more detail by a perspective view. The first lower stage A of plates 13 are oriented at 90° from adjacent plates 13 in the stage. Plates 13 radially converge from an inner wall of the gas recovery conduit 18 toward the center 40 of the gas recovery conduit 18, each stopping short of the center 40. The second stage B of plates 15 are oriented at 90° from adjacent plates 15 in the stage. Plates 15 radially converge from an inner wall of the gas recovery conduit 18 toward the center 40 of the gas recovery conduit 18, each stopping short of the center 40. The plates 13, 15 are preferably made of steel of 0.25 to 1 inch (0.64 to 2.54 cm) thick. The plates 13, 15 may have a width of ⅙ to ⅖ the diameter of the gas recovery conduit 18 and a height that is 0.5 to 2 times the width. Other dimensions may be suitable. The inner wall of the gas recovery conduit 18 is lined with refractory to resist abrasion. Hence, the plates 13, 15 will also be preferably lined with refractory.

Figure 3:
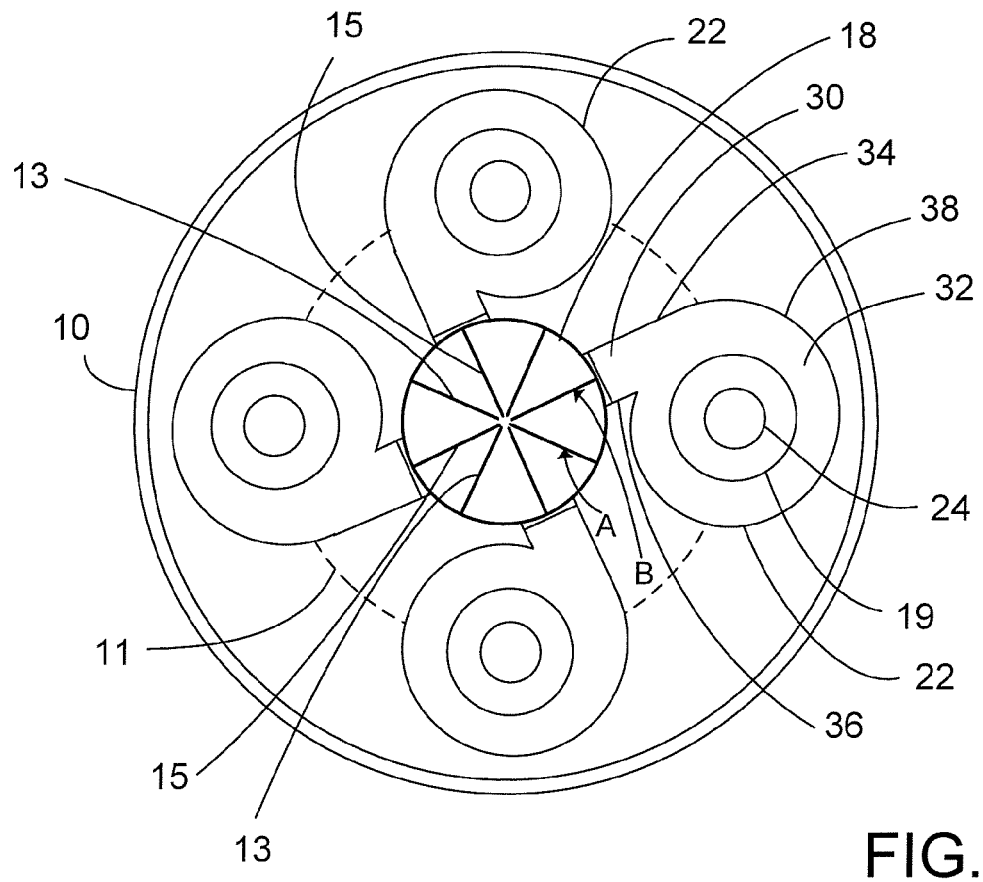
FIG. 3 is a cross-section of FIG. 1 taken along segment A-A.

FIG. 3 shows a cross section of segment A-A of FIG. 1. FIG. 3 illustrates the plates 13, 15 in respective stages A, B of the swirl impeding device 8 are oriented out of phase by 45°. Other orientations are contemplated. Each cyclone 22 may comprise a radial cyclone duct 30 and a barrel chamber 32. A vapor outlet 24 disposed in the center of the barrel chamber 32 provides for the exit of product gases along with only fine amounts of particulate material from the cyclone 22. Hopper 19 provides for the discharge of particulate material from the cyclone 22 into the dense catalyst bed 28 as described with respect to FIG. 1. The cyclone duct 30 is defined by a long, straight sidewall 34 and a short, straight sidewall 36. The long, straight sidewall 34 has a continuous, gradual transition to and, preferably, is tangential with a curved outer wall 38 which defines the barrel chamber 32 of the cyclone 22. The short, straight sidewall 36 has an abrupt, acute transition to curved outer wall 38. The cyclone duct 30 to the cyclones 22 radially exits from the gas recovery conduit 18 but other duct configurations are contemplated. In operation, a mixture of gases and particulate material exits gas recovery conduit 18 into the radial cyclone duct 30 of cyclone 22. The long, straight sidewall 34 and the curved outer wall 38 cooperate to provide a continuous surface which imparts a swirl motion to the mixture entering the cyclone 22 to generate the vortex which separates the particulate material from the gases. If the mixture entering the ducts 30 is swirling, catalyst will impact the downstream sidewall 34, 36, depending on the direction of swirl, potentially causing erosion of the sidewall. However, the swirl impeding device in the gas recovery conduit 18 mitigates or eliminates swirling and the resulting erosion. Moreover, if the rotational swirl motion induced by the upstream swirl arms 14 from the riser is counter-clockwise in FIG. 3, the mixture could tend toward the middle of the cyclone 22 and exit the vapor outlet 24 without encountering the outer sidewall 34 which induce swirling. Impeding swirling before entry into the ducts 30 ensures higher separation efficiency. The swirl impeding device 8 ensures that the mixture enters the cyclone in a straight-in fashion to allow the cyclones 22 to impart swirling motion as designed. The swirl impeding device 8 is compatible with all types of cyclone configurations.

EXAMPLE

Figure 4:
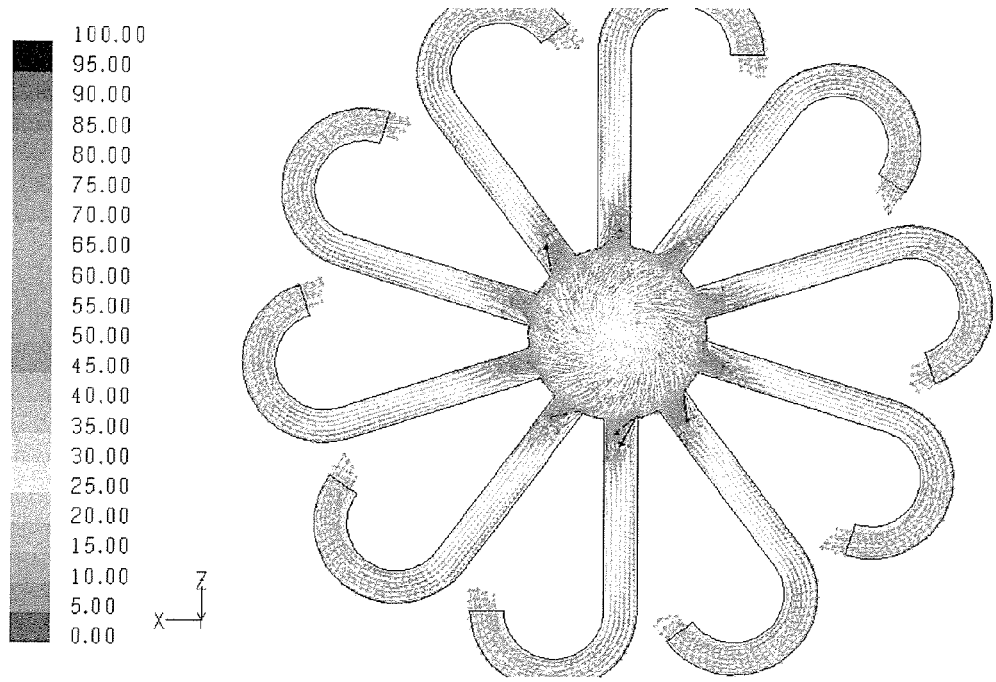
FIG. 4 is computational flow dynamics model showing velocity vectors of a swirling gas-solid mixture entering cyclones.
Figure 5:
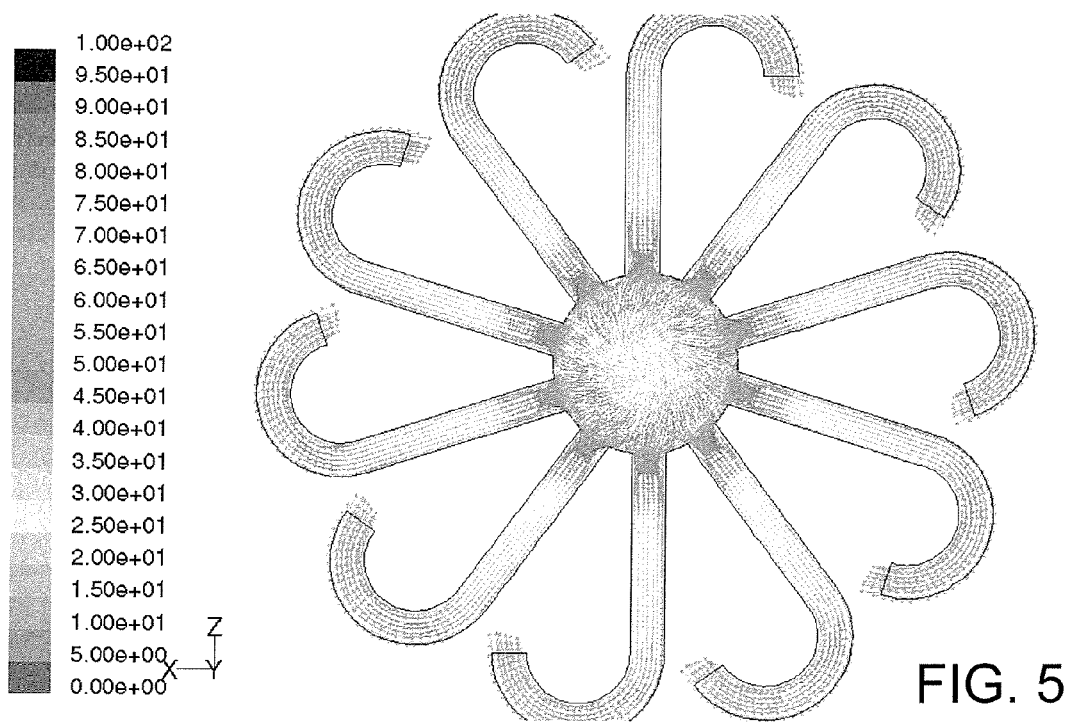
FIG. 5 is computational flow dynamics model showing velocity vectors of a gas-solid mixture impeded from swirling entering cyclones.

Computational flow dynamics (CFD) modeling was conducted to study velocity vector gradient at the duct into a cyclone fed by a gas recovery conduit in upstream communication with a swirl exit from a riser with and without the using a swirl impeding device of the present invention. Scales in FIGS. 4 and 5 indicate ft/sec. FIG. 4 shows the velocity vectors concentrating on downstream sidewalls of cyclone ducts when fed by a swirling mixture from a gas recovery conduit. FIG. 5 shows the velocity vectors evenly entering cyclone ducts without bias when swirling is impeded in the gas recovery conduit according to the present invention.

The invention claimed is:

1. A process for the fluidized catalytic cracking of a hydrocarbon feedstock comprising:

passing a hydrocarbon feedstock and solid catalyst particles into a reaction conduit to produce a mixture of solid catalyst particles and gaseous fluids;

inducing said mixture of said catalyst particles and gaseous fluids to swirl in an angular direction to decrease the catalyst particle concentration and increase the gaseous fluids concentration in said mixture;

transporting said mixture upwardly into a gas recovery conduit;

impeding the swirling velocity of said mixture in said gas recovery conduit;

transporting said mixture to at least one cyclone; and inducing said mixture to swirl in said cyclone to further decrease the catalyst particle concentration and further increase the gaseous fluids concentration in said mixture.

2. The process of claim 1 wherein at least one plate attached to a wall of the gas recovery conduit impedes the swirling.

3. The process of claim 2 wherein said at least one plate extends radially from said wall.

4. The process of claim 3 wherein a plurality of plates radially converge toward a center of said gas recovery conduit.

5. The process of claim 4 wherein two stages of a plurality of plates radially converge toward a center of said gas recovery conduit.

6. The process of claim 5 wherein said plurality of plates do not extend all the way to the center of the gas recovery conduit.

7. The process of claim 1 wherein said mixture exits said reaction conduit through a swirl arm to induce swirling in a separation vessel.

8. The process of claim 1 wherein said mixture is transported from said separation vessel to said cyclone through said gas recovery conduit.

9. The process of claim 3 wherein said cyclone directly communicates with said gas recovery conduit.

10. The process of claim 1 wherein said mixture exits from said reaction conduit into a separation vessel and said gas recovery conduit directly communicates with said cyclone.

11. The process of claim 1 further including depositing catalyst particles removed from said mixture in said cyclone into a stripping zone, contacting said catalyst particles with a stripping gas in said stripping zone, recovering stripped catalyst particles from said stripping zone and collecting gaseous fluids from said stripping zone.

* * * * *